(12) United States Patent
Yonezawa et al.

(10) Patent No.: US 9,808,968 B2
(45) Date of Patent: Nov. 7, 2017

(54) MOLD, MOLDING MACHINE, AND FOAMED MOLDED BODY MANUFACTURING METHOD

(75) Inventors: Taisuke Yonezawa, Yokohama (JP); Yoshinori Ohashi, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 602 days.

(21) Appl. No.: 14/360,409

(22) PCT Filed: Jun. 7, 2012

(86) PCT No.: PCT/JP2012/064681
§ 371 (c)(1),
(2), (4) Date: May 23, 2014

(87) PCT Pub. No.: WO2013/080589
PCT Pub. Date: Jun. 6, 2013

(65) Prior Publication Data
US 2014/0312521 A1   Oct. 23, 2014

(30) Foreign Application Priority Data
Nov. 30, 2011   (JP) .................. 2011-262361

(51) Int. Cl.
*B29C 44/58* (2006.01)
*B29C 33/10* (2006.01)

(52) U.S. Cl.
CPC ............ *B29C 44/588* (2013.01); *B29C 33/10* (2013.01); *B29C 44/587* (2013.01); *B29C 44/586* (2013.01)

(58) Field of Classification Search
CPC ..... B29C 33/10; B29C 44/588; B29C 44/586; B29C 44/587
(Continued)

(56) References Cited

U.S. PATENT DOCUMENTS

| 5,466,404 A * | 11/1995 | Kiefer | .................. B29C 44/588 |
| | | | 264/276 |
| 2003/0107145 A1* | 6/2003 | Ozasa | .................... B29C 44/14 |
| | | | 264/46.9 |

FOREIGN PATENT DOCUMENTS

| JP | 55-103936 A | 8/1980 |
| JP | 5-116158 A | 5/1993 |
| (Continued) | | |

OTHER PUBLICATIONS

Machine translation of abstract for JP2006192831, Jul. 2006.*
(Continued)

*Primary Examiner* — Philip Tucker
*Assistant Examiner* — Jimmy R Smith, Jr.
(74) *Attorney, Agent, or Firm* — Sughrue Mion, PLLC

(57) ABSTRACT

A mold, a molding machine, and a foamed molded body manufacturing method are provided that are capable of more reliably preventing ingress of foamed resin into a gas discharge hole using a gas-impermeable member and capable of adequately discharging gas inside the cavity to the cavity outside through the gas discharge hole during foam molding, and that are also capable of achieving good design characteristics in a foamed molded body. A gas discharge hole 5 is provided at a cavity 4 inner face of a mold 1 and discharges gas inside the cavity 4 to outside the cavity 4. A gas-permeable member 6 is disposed inside the cavity 4 of the mold 1 so as to cover the gas discharge hole 5, and a gas-impermeable member 8 is disposed on the gas discharge hole 5 side of the gas-permeable member 6 so as to face the gas discharge hole 5. A portion of the gas discharge hole 5, spanning at least from axial direction intermediate portion of the gas discharge hole 5 to the cavity 4 side of the gas discharge hole 5, is configured with a
(Continued)

tapered profile portion 5a that increases in diameter on progression toward the cavity 4 side.

6 Claims, 5 Drawing Sheets

(58) Field of Classification Search
USPC .............................................. 425/546; 264/51
See application file for complete search history.

(56) References Cited

FOREIGN PATENT DOCUMENTS

| JP | 8-39579 A | | 2/1996 |
|----|-----------|---|--------|
| JP | 2004-358910 A | | 12/2004 |
| JP | 2006-192831 A | | 7/2006 |
| JP | 2006192831 A | * | 7/2006 |

OTHER PUBLICATIONS

Machine translation of JP2006192831, Jul. 2006.*
International Search Report for PCT/JP2012/064681 dated Aug. 7, 2012.

* cited by examiner

MOLD, MOLDING MACHINE, AND FOAMED MOLDED BODY MANUFACTURING METHOD

CROSS REFERENCE TO RELATED APPLICATIONS

This application is a National Stage of International Application No. PCT/JP2012/064681, filed on Jun. 7, 2012, which claims priority from Japanese Patent Application No. 2011-262361, filed on Nov. 30, 2011, the contents of all of which are incorporated herein by reference in their entirety.

TECHNICAL FIELD

The present invention relates to a mold that is employed to manufacture a foamed molded body such as a seat pad, the mold being provided with a gas discharge hole that discharges gas inside a cavity to outside the cavity during foam molding, and particularly relates to a mold in which a gas-permeable member is disposed inside the cavity so as to cover the gas discharge hole and a gas-impermeable member is disposed on the gas discharge hole side of the gas-permeable member so as to face the gas discharge hole. The present invention moreover relates to a molding machine that includes: a mold provided with a gas discharge hole that discharges gas inside a cavity to outside the cavity; a gas-permeable member that is disposed inside the cavity of the mold so as to cover the gas discharge hole; and a gas-impermeable member that is disposed on the gas discharge hole side of the gas-permeable member so as to face the gas discharge hole. The present invention moreover relates to a foamed molded body manufacturing method employing such a mold.

BACKGROUND ART

Foamed molded bodies configured from foamed synthetic resins such as polyurethane foam are employed in for example seat pads configuring vehicle seats, and in vehicle door interior components. In foamed molded body manufacturing processes, a mold release agent is applied to a cavity inner face of a mold before supplying into the cavity a specific amount of a foamable resin raw material for forming soft polyurethane foam. The mold is then closed, and the foamable resin raw material is foamed and cured. The foamable resin raw material fills the inside of the cavity as it expands, assuming a shape corresponding to the cavity. During this process, defects such as surface hollows and voids can occur in the molded body when air, as well as gases such as carbon dioxide that are generated by the foaming reaction, that are present inside the cavity cannot be adequately discharged to the cavity outside.

Molds are therefore provided with gas discharge holes to discharge gas from inside the cavity. However, providing gas discharge holes on their own can result in foamable resin raw material that has filled the cavity flowing out through the gas discharge holes to the outside of the cavity, resulting in the joint issues of raw material loss, and of necessitating a cleanup operation of the gas discharge holes.

Patent Document 1 (Japanese Patent Application Laid-Open (JP-A) No. 2006-192831) describes disposing inside a mold cavity a gas-permeable member that is configured from a plate shaped gas permeable slab or from nonwoven cloth and to which is attached a gas-impermeable sheet capable of covering a gas discharge hole. In a foam molding process employing this mold, gas inside the cavity passes through the gas-permeable member and passes between the gas-impermeable sheet and a cavity inner face to flow out through the gas discharge hole to the outside of the mold until the foamed resin has filled the inside of the cavity. As the foamed resin fills up the inside of the cavity, the gas-permeable member is pressed against the cavity inner face under the pressure of foaming foamable resin raw material, such that the gas-impermeable sheet blocks off the gas discharge hole. The foamed resin is thereby prevented from entering the gas discharge hole. In Patent Document 1, the gas discharge hole is configured with a uniform internal diameter along its entire axial direction length (namely from an entry side that opens onto the cavity to an exit side that opens onto an outer face of the mold).

In the embodiment illustrated in FIG. 7 to FIG. 10 of Patent Document 1, protruded portions are provided at the cavity inner face at the periphery of the gas discharge hole so as to protrude out toward the cavity inside. During foam molding, when the gas-permeable member is pressed toward the cavity inner face by the foamed resin filling the cavity inside, the gas-permeable member contacts the protruded portions through the gas-impermeable sheet. When this occurs, the gas-permeable member is supported by the protruded portions through the gas-impermeable sheet, achieving a state in which a space that is in communication with the gas discharge hole remains between the gas-impermeable sheet and the cavity inner face, enabling gas inside the cavity to be discharged to the cavity outside through this space and through the gas discharge hole. Then, as foaming and curing of the foamed resin raw material proceeds, the foamed resin presses the gas-permeable member further against the cavity inner face, whereby the protruded portions dig into the gas-permeable member through the gas-impermeable sheet, and the gas-impermeable sheet becomes even closer to the cavity inner face, blocking off the gas discharge hole. The foamed resin is thereby prevented from entering the gas discharge hole.
Patent Document 1: JP-A No. 2006-192831

SUMMARY OF INVENTION

Technical Problem

In the foamed molded body manufacturing method of Patent Document 1, there is a possibility of the gas-impermeable sheet contacting the cavity inner face accompanying expansion of the foamed resin even in a state in which gas still remains between the gas-permeable member and the cavity inner face.

Due to shape of the gas discharge hole in the mold of Patent Document 1, the corner of the edge portion at the intersection between an inner peripheral face of the gas discharge hole and the cavity inner face is liable to dig into the gas-impermeable sheet when the gas-impermeable sheet contacts the cavity inner face at a peripheral edge portion of the gas discharge hole. There is therefore a concern of gas inside the cavity to not being able to pass easily between the gas-impermeable sheet and the cavity inner face and flow into the gas discharge hole after the gas-impermeable sheet has contacted the cavity inner face.

In the embodiment illustrated in FIG. 7 to FIG. 10 of Patent Document 1, contact between the gas-impermeable sheet and the cavity inner face is delayed due to providing the protruded portions at the periphery of the gas discharge hole. However, since the protruded portions are disposed at the periphery of the gas discharge hole, portions where the gas-permeable member overlaps with the gas discharge hole are not supported by the protruded portions. As a result, supposing the gas-permeable member were to be configured from a flexible material such as a nonwoven cloth, there would be a concern of difficultly in keeping the gas-impermeable member on the gas discharge hole side of the protruded portions apart from the cavity inner face once the gas-permeable member has contacted the protruded portions through the gas-impermeable member.

Moreover, in the embodiment illustrated in FIG. 7 to FIG. 10 of Patent Document 1, the protruded portions dig into the gas-permeable member through the gas-impermeable member during the foam molding process, thereby leaving dimpled portions corresponding to the protruding portions on the surface of the completed molded body. There is accordingly a concern of detriment to the design characteristics of the foamed molded body.

An object of the present invention is to provide a mold and molding machine, as well as a foamed molded body manufacturing method employing the mold, that are capable of adequately preventing ingress of foamed resin into a gas discharge hole using a gas-impermeable member and capable of adequately discharging gas inside the cavity to the cavity outside through the gas discharge hole during foam molding, and that are also capable of achieving good design characteristics in a foamed molded body.

Solution to Problem

The present invention provides a mold employed to manufacture a foamed molded body configured from a foamed synthetic resin, the mold including: a gas discharge hole that is provided at a cavity inner face of the mold and that discharges gas inside a cavity to outside the cavity; a gas-permeable member that is disposed inside the cavity so as to cover the gas discharge hole; and a gas-impermeable member that is disposed on a gas discharge hole side of the gas-permeable member so as to face the gas discharge hole. A portion of the gas discharge hole, spanning at least from an axial direction intermediate portion of the gas discharge hole to a cavity side of the gas discharge hole, is configured with a tapered profile portion that increases in diameter on progression toward the cavity side.

Configuration may be made wherein an inner peripheral face of the tapered profile portion of the gas discharge hole and the cavity inner face form an angle of intersection of from 30° to 60° in a cross-section along the axis of the gas discharge hole.

Configuration may be made wherein an end portion of the tapered profile portion on the opposite side to the cavity has an internal diameter of from 2 mm to 6 mm.

Configuration may be made wherein the gas discharge hole is provided at a gas discharge hole formation member that is configured as a separate body to the mold; the gas discharge hole is provided at the mold by attaching the gas discharge hole formation member to the mold; and the gas discharge hole formation member is removably attached to the mold.

The present invention provides a molding machine including: a mold that is employed to manufacture a foamed molded body configured from a foamed synthetic resin, a cavity inner face of the mold being provided with a gas discharge hole that discharges gas inside a cavity to outside the cavity; a gas-permeable member that is disposed inside the cavity so as to cover the gas discharge hole; and a gas-impermeable member that is disposed on a gas discharge hole side of the gas-permeable member so as to face the gas discharge hole. A portion of the gas discharge hole of the mold, spanning at least from an axial direction intermediate portion of the gas discharge hole to a cavity side of the gas discharge hole, is configured with a tapered profile portion that increases in diameter on progression toward the cavity side.

The present invention provides a foamed molded body manufacturing method for manufacturing a foamed molded body employing the above mold. The foamed molded body manufacturing method includes: a gas-permeable member and gas-impermeable member placement process of disposing the gas-permeable member inside the cavity of the mold so as to cover the gas discharge hole, and disposing the gas-impermeable member on the gas discharge hole side of the gas-permeable member so as to the face the gas discharge hole; and a foam molding process of foaming a foamable synthetic resin raw material inside the cavity after the gas-permeable member and gas-impermeable member placement process.

Configuration may be made wherein the gas-impermeable member is adhered to the gas-permeable member using a pressure-sensitive adhesive or bonding agent; and the pressure-sensitive adhesive or bonding agent does not contain organic solvent, or any organic solvent contained in the pressure-sensitive adhesive or bonding agent is at a ratio of 0.5% by mass or lower.

Configuration may be made wherein the gas-impermeable member is configured from a pulp, or from a laminated body of a pulp and an SBR resin.

Configuration may be made wherein the gas-impermeable member is configured in a sheet form extending along a gas discharge hole side face of the gas-permeable member; and the gas-impermeable member has a thickness of from 0.05 mm to 0.2 mm, a tensile strength of from 30N/15 mm to 90N/15 mm as specified by JIS-Z-0237, and an elongation percentage of from 1% to 10% as specified by JIS-Z-0237.

Configuration may be made wherein the foamed molded body is a seat pad.

Advantageous Effects of Invention

In the mold of the present invention, the portion of the gas discharge hole spanning at least from an axial direction intermediate portion of the gas discharge hole to the cavity side of the gas discharge hole configures the tapered profile portion that increases in diameter on progression toward the cavity side. An inner peripheral face of the tapered profile portion and the cavity inner face at the periphery of the gas discharge hole thereby intersect at a relatively gentle angle. As a result, a peripheral edge portion of the gas discharge hole (namely the corner of the edge portion between the inner peripheral face of the tapered profile portion of the gas discharge hole and the cavity inner face at the periphery of the gas discharge hole) are not liable to dig into the gas-impermeable member during a foam molding process, even when the gas-impermeable member is pressed by the expanding foamed resin inside the cavity in a relatively low pressure state and makes contact with the peripheral edge portion of the gas discharge hole.

Accordingly, even supposing a case in which the gas-impermeable member were to contact the peripheral edge portion of the gas discharge hole in a state with gas still remaining between the gas-permeable member and the cavity inner face, since the peripheral edge portion of the gas discharge hole is not liable to dig into the gas-impermeable member, gas inside the cavity can pass relatively easily between the cavity inner face and the gas-permeable member and flow into the gas discharge hole. As a result, gas inside the cavity is adequately discharged to the outside of the cavity, thereby adequately preventing molding defects such as voids from occurring in the foamed molded body.

Then, as expansion of the foamed resin proceeds, the gas-impermeable member is pressed firmly against the peripheral edge portion of the gas discharge hole by the foamed resin, such that the peripheral edge portion of the gas discharge hole digs into the gas-impermeable member. The foamed resin can thereby be adequately prevented from passing between the gas-impermeable member and the peripheral edge portion of the gas discharge hole and entering the gas discharge hole. As a result, loss of the raw material of the foamed resin can be reliably prevented, as well as facilitating a cleanup operation of the gas discharge hole.

In the mold of the present invention, the cavity inner face does not need to be provided with protruded portions for delaying contact between the gas-impermeable member and the peripheral edge portion of the gas discharge hole. The surface of the completed foamed molded body is therefore not formed with dimpled portions corresponding to such protruded portions, thereby enabling good design characteristics to be achieved for the foamed molded body.

The angle of intersection between the inner peripheral face of the tapered profile portion of the gas discharge hole and the cavity inner face of the mold is preferably set at from 30° to 60° in a cross-section along the axis of the gas discharge hole. This configuration enables the peripheral edge portion of the gas discharge hole to be more reliably prevented from digging into the gas-impermeable member excessively before the foamed resin has expanded sufficiently inside the cavity, even when the gas-impermeable member is pressed by the foamed resin and contacts the peripheral edge portion of the gas discharge hole. Moreover, after the foamed resin has expanded sufficiently, the peripheral edge portion of the gas discharge hole digs into the gas-impermeable member sufficiently to enable the foamed resin inside the cavity to be more reliably prevented from entering the gas discharge hole.

The internal diameter of the end portion of the tapered profile portion of the gas discharge hole on the opposite side to the cavity (namely the smallest internal diameter of the gas discharge hole) is set at from 2 mm to 6 mm, thereby enabling an adequate gas discharge rate to be secured through the gas discharge hole to the outside of the cavity.

The gas discharge hole of the mold is provided at the gas discharge hole formation member that is configured as a separate body to the mold and that is attached to the mold. By removably attaching the gas discharge hole formation member to the mold, the gas discharge hole formation member can be removed from the mold, for example for cleaning or replacement of the gas discharge hole, facilitating mold maintenance and enabling maintenance costs of the mold to be suppressed.

In the foamed molded body manufacturing method employing the mold of the present invention, gas inside the cavity can be adequately discharged to the cavity outside through the gas discharge hole during foam molding, and ingress of the foamed resin inside the cavity into the gas discharge hole can be more reliably prevented. Good design characteristics can moreover be achieved for a foamed molded body manufactured using this method.

In the foamed molded body manufacturing method employing the mold of the present invention, the gas-impermeable member is disposed at the gas discharge hole side of the gas-permeable member so as to the face the gas discharge hole. Accordingly, during the foam molding process the foamed resin can be effectively prevented from impregnating the gas-permeable member as gas inside the cavity passes through the gas-permeable member and flows out through the gas discharge hole. As a result, the foamed molded body manufacturing method exhibits operation and advantageous effects such as preventing a screeching noise during use of the foamed molded body caused by impregnation of the gas-permeable member by the foamed resin, as well as achieving a reduction in the weight of the foamed molded body.

Volatile organic compounds (VOC) such as formaldehyde, toluene, and xylene are a cause of for example sick building syndrome and multiple chemical sensitivity, and so the release of such compounds should be avoided as far as possible in materials employed inside for example buildings and vehicles. To meet this demand, when using pressure-sensitive adhesive or bonding agent to adhere the gas-impermeable member to the gas-permeable member, the pressure-sensitive adhesive or bonding agent preferably does not contain organic solvent, or any organic solvent contained in the pressure-sensitive adhesive or bonding agent is at a ratio of 0.5% by mass or lower. Due to employing such a pressure-sensitive adhesive or bonding agent, volatile organic compounds are in effect completely, or almost completely, eliminated from the pressure-sensitive adhesive or bonding agent. The release of volatile organic compounds from the foamed molded body manufactured using the gas-impermeable member attached to the gas-permeable member can accordingly be more reliably prevented or suppressed.

Note that in the present invention, a pressure-sensitive adhesive refers to an adhesive that is disposed between the gas-permeable member and the gas-impermeable member and effectively requires only the application of force to adhere the two together, whereas a bonding agent refers to a substance that adheres the two together by for example moisture curing, solvent vaporization, or a chemical reaction.

The gas-impermeable member is preferably configured from a pulp, or from a laminated body of a pulp and a styrene-butadiene rubber (SBR) resin. Configuring the gas-impermeable member from such materials enables the gas-impermeable member to be made flexible. Accordingly, the gas-impermeable member readily assumes a shape conforming to the cavity inner face when the foamed resin has filled the inside of the cavity of the mold. Good shaping precision of the foamed molded body that is molded in the cavity, and good sealing characteristics of the gas discharge hole of the mold by the gas-impermeable member are accordingly enabled.

The gas-impermeable member is configured in a sheet form extending along a gas discharge hole side face of the gas-permeable member, and preferably has a thickness of from 0.05 mm to 0.2 mm, and a tensile strength of from 30N/15 mm to 90N/15 mm and an elongation percentage of from 1% to 10% as respectively specified by JIS-Z-0237. The gas-impermeable member accordingly has excellent ability to conform to the inner face profile of the cavity, and is also able to maintain a well-sealed state of the gas discharge hole of the mold against pressing force from the foamed resin inside the cavity. Even better shaping precision of the foamed molded body, and even better sealing characteristics of the gas discharge hole of the mold by the gas-impermeable member are accordingly enabled.

The mold of the present invention is suitably applied to a seat pad manufacturing method.

BRIEF DESCRIPTION OF DRAWINGS

FIG. 2b is a cross-section taken along line IIb-IIb in FIG. 2a.

DESCRIPTION OF EMBODIMENTS

Explanation follows regarding exemplary embodiments of the present invention, with reference to the drawings. Note that in the following exemplary embodiments, explanation is given regarding an example in which the present invention is applied to a mold employed to manufacture a seat pad, however the present invention may also be applied to a mold employed to manufacture a foam molded body other than a seat pad.

First Exemplary Embodiment

Figure 1:
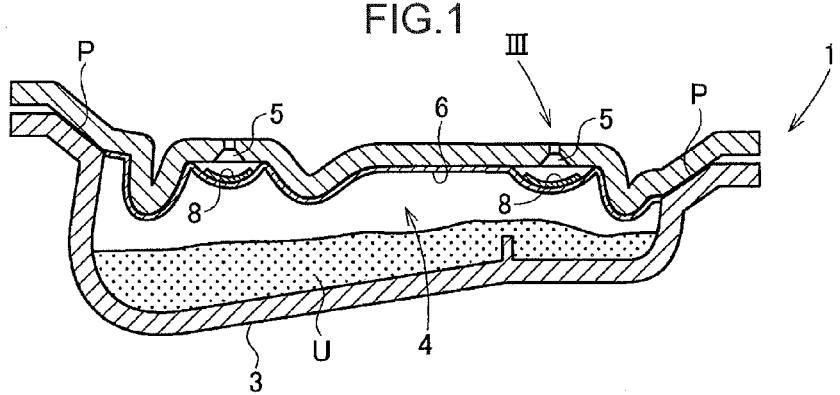
FIG. 1 is a cross-section view illustrating a mold according to a first exemplary embodiment.
Figure 2A:
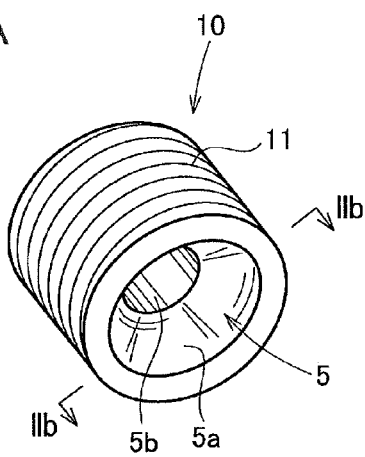
FIG. 2a is a perspective view illustrating a gas discharge hole formation member provided at the mold of FIG. 1.
Figure 2B:
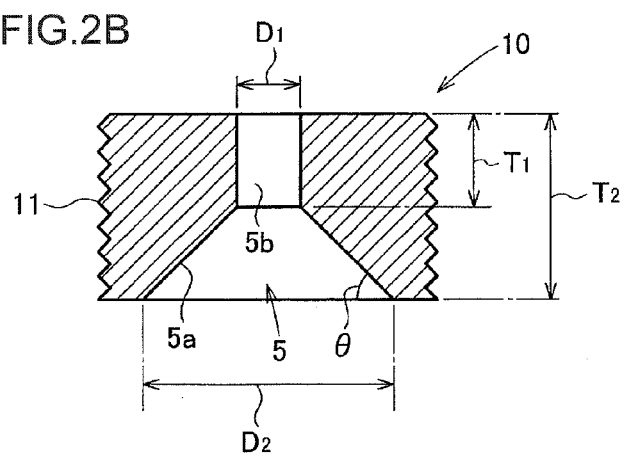
Figure 3:
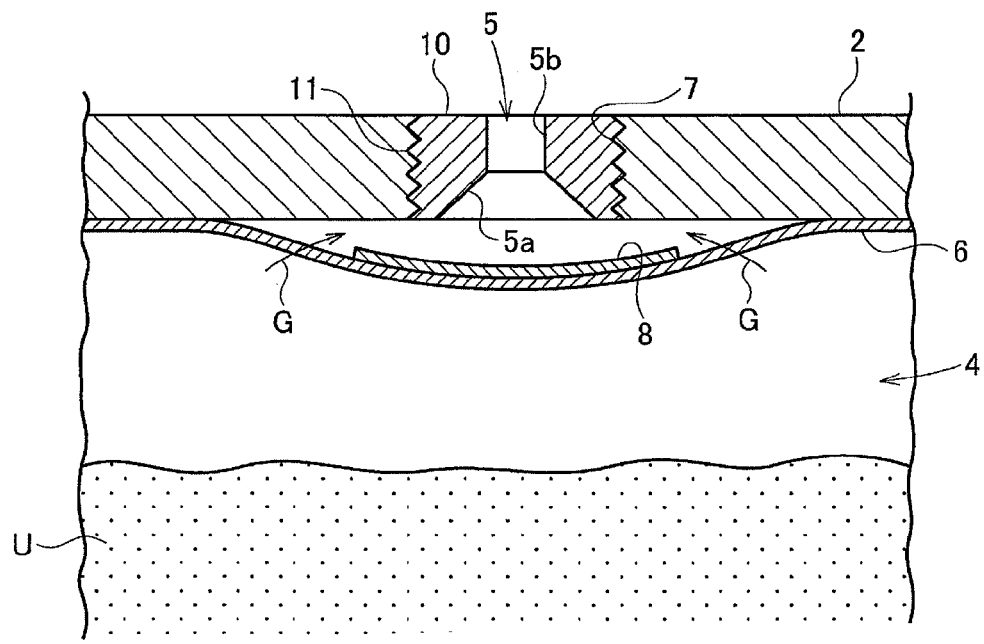
FIG. 3 is an enlarged cross-section of the portion indicated by III in FIG. 1.
Figure 4:
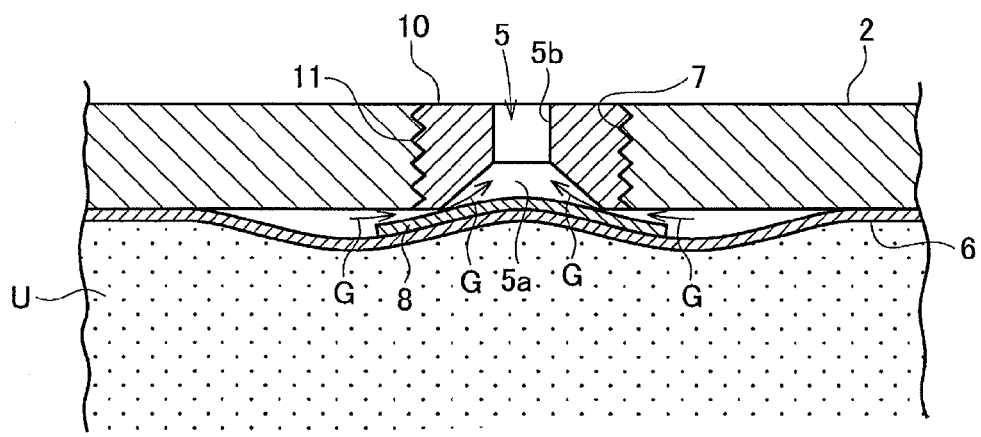
FIG. 4 is a cross-section view illustrating a similar portion to that of FIG. 3 partway through a foam molding process.
Figure 5:
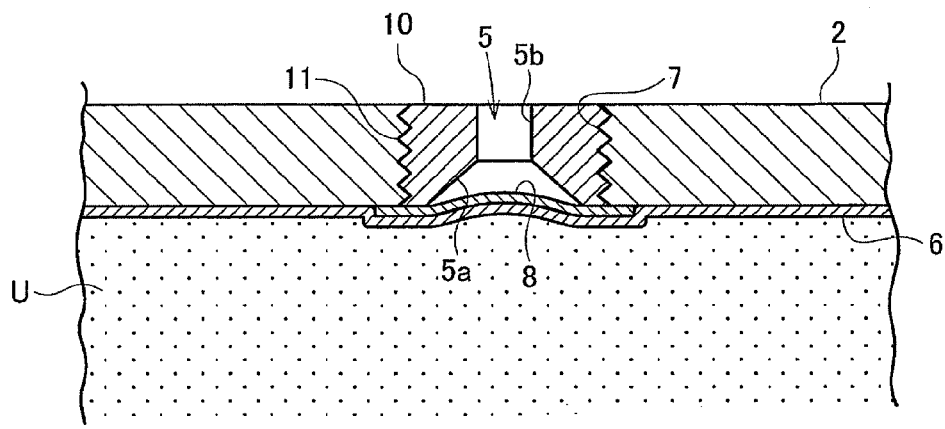
FIG. 5 is a cross-section view illustrating a similar portion to that of FIG. 3 at completion of the foam molding process.
Figure 6:
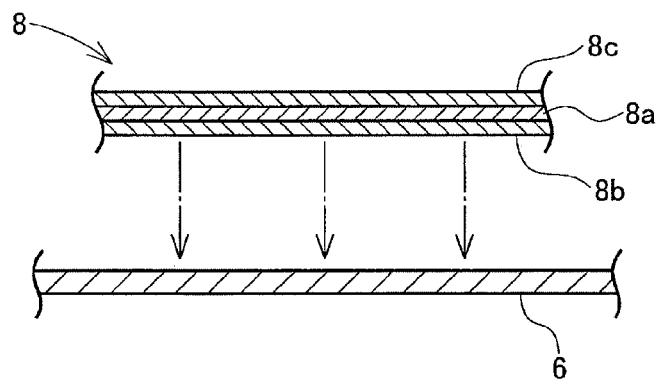
FIG. 6 is an exploded cross-section view illustrating a reinforcement material provided with a gas-impermeable sheet.

FIG. 1 is a cross-section of a mold according to a first exemplary embodiment. FIG. 2a is a perspective view illustrating a gas discharge hole forming member provided at the mold. FIG. 2b is a cross-section taken along line IIb-IIb in FIG. 2a. FIG. 3 is an enlarged cross-section of the portion indicated by III in FIG. 1, and illustrates a state prior to a gas-impermeable member making contact with a cavity inner face of the mold partway through a foam molding process. FIG. 4 is a cross-section view illustrating the same portion as FIG. 3, and illustrates a state in which the gas-impermeable member has made contact with a peripheral edge portion of the gas discharge hole partway through the foam molding process. FIG. 5 is a cross-section view illustrating the same portion as FIG. 3, and illustrates completion of the foam molding process. FIG. 6 is an exploded cross-section of a reinforcement material with a gas-impermeable sheet.

In the present exemplary embodiment, a mold 1 is employed in manufacture of a seat pad configuring a vehicle seat. The seat pad is configured by a foamed synthetic resin such as a polyurethane foam. Namely, the seat pad corresponds to the foamed molded body of claim 1. Note that in the present exemplary embodiment, the seat pad is a cushion pad configuring a seat portion of the vehicle seat, however the present invention may also be applied to a back pad configuring a seatback portion of the vehicle seat. FIG. 1 is a vertical cross-section taken along the front-rear direction when the seat pad (cushion pad) molded by the mold 1 is in use (referred to below as simply the front-rear direction).

In the present exemplary embodiment, as illustrated in FIG. 1, the mold 1 is provided with components including an upper mold 2, a lower mold 3, and gas discharge holes 5 that expel gas present inside a cavity 4 enclosed by the upper mold 2 and the lower mold 3 to the cavity 4 outside. Note that the mold 1 may further include a mold core (not illustrated in the drawings). Peripheral edge portions of the upper mold 2 and the lower mold 3 are die-matched to each other. In FIG. 1, the letter P indicates a parting line between the upper mold 2 and the lower mold 3. During foam molding, gas inside the cavity 4 is expelled through the parting line P.

In the present exemplary embodiment, the gas discharge holes 5 are provided further toward ar central side of the cavity inner face of the upper mold 2 than the parting line P. The gas discharge holes 5 are disposed at portions of the cavity inner face of the upper mold 2 where it is difficult for gas to escape through the parting line P alone during foam molding, such as portions positioned higher than the parting line P, or portions where there are locations lower than the parting line P present between themselves and the parting line P. In FIG. 1, two of the gas discharge holes 5 are illustrated disposed at a separation in the seat pad front-rear direction, however the number and placement of the gas discharge holes 5 is not limited thereto. Note that the gas discharge holes 5 may also be provided at the lower mold 3 as required.

The seat pad is foam molded with the seat face facing downward in the cavity 4 of the mold 1. Namely, the seat face of the seat pad is molded by a cavity inner face of the lower mold 3, and the opposite side face of the seat pad to the seat face (referred to below as the back face) is molded by the cavity inner face of the upper mold 2. A reinforcement material 6 is provided at the back face of the seat pad. In the present exemplary embodiment, the reinforcement material 6 is configured from a material that is permeable to gas, such as a nonwoven fabric. Namely, in the present exemplary embodiment the reinforcement material 6 corresponds to the gas-permeable member of claim 1. The reinforcement material 6 is disposed along the cavity inner face of the upper mold 2 prior to the seat pad foam molding process, and is fixed to the upper mold 2 using fixing implements (not illustrated in the drawings) such as pins or magnets. When this is performed, the respective gas discharge holes 5 are covered by the reinforcement material 6.

Gas-impermeable sheets 8 configured from a gas-impermeable material are provided at the face of the reinforcement material 6 on the side of the gas discharge holes 5 at regions of the reinforcement material 6 that overlap with the respective gas discharge holes 5 and the surrounding cavity inner face of the upper mold 2. Namely, in the present exemplary embodiment the gas-impermeable sheets 8 correspond to the gas-impermeable member of claim 1. The gas-impermeable material configuring the gas-impermeable sheets 8 is preferably for example a pressure-sensitive adhesive coated PET film, a pressure-sensitive adhesive coated paper tape, or a pressure-sensitive adhesive coated PP film. The gas-impermeable sheets 8 are preferably of a size of the reinforcement material 6 to cover a radius of from 15 mm to 40 mm, and particularly preferably from 20 mm to 30 mm, from the centers of the respective gas discharge holes 5.

The gas-impermeable sheets 8 are preferably configured from a material capable of undergoing relatively flexible deformation so as to conform to the inner face of the mold 1 when the gas-impermeable sheets 8 are pressed by the expanded foamed resin inside the mold 1. For example, the gas-impermeable sheets 8 are preferably configured from a pulp, or a laminated body of a pulp and an SBR resin. When the gas-impermeable sheets 8 are configured from a pulp, or from a laminated body of a pulp and an SBR resin, the gas-impermeable sheets 8 exhibit excellent flexibility as well as good handling properties (such as ease of use when pulling out and cutting a specific length from a wound up rolled state, such of tape), and are moreover not liable to generate a screeching sound.

In the present exemplary embodiment, as illustrated in FIG. 6, the gas-impermeable sheets 8 are configured including a sheet-form substrate 8a, a pressure-sensitive adhesive layer 8b formed to one (the reinforcement material 6 side) face of the substrate 8a, and a covering layer 8c formed to the other (the gas discharge hole 5 side) face of the substrate 8a. Note that the configuration of the gas-impermeable sheets 8 is not limited thereto. For example, the substrate 8a may be configured from a pulp, with the covering layer 8c being configured from an SBR resin. Japanese paper is, for example, suitably employed for such a pulp substrate 8a. Note that the materials of the substrate 8a and the covering layer 8c are not limited thereto.

The substrate 8a itself may be gas-permeable, in which case gas-impermeable properties may be imparted by at least one of the pressure-sensitive adhesive layer 8b or the covering layer 8c covering the surfaces of the substrate 8a. When gas-impermeable properties are imparted by the pressure-sensitive adhesive layer 8b, the covering layer 8c may be omitted. The substrate 8a itself may also be gas-impermeable. When the gas-impermeable sheets 8 are transported in a wound up rolled state such as a tape reel, the covering layer 8c may be provided at enable separation from the pressure-sensitive adhesive layer 8b. A bonding agent layer may be formed in place of the pressure-sensitive adhesive layer 8b.

The pressure-sensitive adhesive or the bonding agent for adhering the gas-impermeable sheets 8 to the reinforcement material 6 preferably does not contain organic solvent, or contains organic solvent at a ratio of 0.5% by mass or lower. Hot melt or emulsion pressure-sensitive adhesives or the like are suitably employed for such a pressure-sensitive adhesive or bonding agent.

The thickness of the gas-impermeable sheets 8 is preferably from 0.05 mm to 0.20 mm, and particularly preferably from 0.05 mm to 0.15 mm. The gas-impermeable sheets 8 preferably have a tensile strength of from 30N/15 mm to 90N/15 mm, and particularly preferably from 40N/15 mm to 60N/15 mm, as specified by JIS-Z-0237. The gas-impermeable sheets 8 preferably have a rate of elongation of from 1% to 10%, and particularly preferably from 2% to 5%, as specified by JIS-Z-0237.

As illustrated in FIG. 2b and FIG. 3 to FIG. 5, in the present exemplary embodiment a portion on the cavity 4 side of an axial direction intermediate portion of each of the gas discharge holes 5 is configured with a tapered profile portion 5a that increases in diameter on progression toward the cavity 4 side, and a portion further to the cavity 4 outside than the tapered profile portion 5a is configured with a uniform diameter portion 5b that has a substantially uniform internal diameter.

As illustrated in FIG. 2b, an inner peripheral face of the tapered profile portion 5a and the inner face of the cavity 4 preferably meet with an angle of intersection $\theta$ of from 10° to 80°, particularly preferably from 30° to 60°, even more preferably from 40° to 50°, and most preferably 45°. Note that as the angle of intersection $\theta$ approaches 90° from 45°, during the foam molding process the peripheral edge portions of the gas discharge holes 5 become more liable to dig into the gas-impermeable sheets 8 when the gas-impermeable sheets 8 are pressed by the expanding foamed resin U and contact the peripheral edge portions of the gas discharge holes 5, even under lower pressing pressure from a foamed resin U. Moreover, as the angle of intersection $\theta$ approaches 0° from 45°, the tapered profile portion 5a becomes shallower, thereby increasing the likelihood of the gas-impermeable sheets 8 contacting cavity 4 side peripheral edge portions of the uniform diameter portions 5b (the corner of the edge portion between the inner peripheral face of the tapered profile portion 5a and the inner peripheral face of the uniform diameter portion 5b, referred to below simply as the uniform diameter portion 5b peripheral edge portion). In such cases, as the angle of intersection $\theta$ approaches 0°, the angle of intersection between the inner peripheral face of the tapered profile portion 5a and the inner peripheral face of the uniform diameter portion 5b approaches 90°. As a result, the uniform diameter portion 5b peripheral edge portion becomes liable to dig into the gas-impermeable sheets 8 when the gas-impermeable sheets 8 are pressed by the expanding foamed resin U and contact the uniform diameter portion 5b peripheral edge portion, even under a low pressing pressure from the foamed resin U.

When the mold 1 is employed in manufacture of a general vehicle seat pad, the internal diameter $D_1$ of an end portion of the tapered profile portion 5a on the opposite side to the cavity 4 (the smallest internal diameter of the gas discharge hole 5 (=the internal diameter of the uniform diameter portion 5b in the present exemplary embodiment)) is preferably an internal diameter similar to that of gas discharge holes in conventional molds employed in vehicle seat pad manufacture, of from 2 mm to 6 mm, and is particularly preferably from 4 mm to 6 mm. The internal diameter $D_2$ of a cavity 4 side end portion of the tapered profile portion 5a (the largest internal diameter of the gas discharge hole 5) is preferably from 6 mm to 12 mm and is particularly preferably from 8 mm to 10 mm.

As illustrated in FIG. 2b, a length $T_1$ of the uniform diameter portion 5b in the gas discharge hole 5 axial direction, and a thickness $T_2$ of the upper mold 2 surrounding the gas discharge holes 5 (=the axial direction length of a gas discharge hole formation member 10 of the present exemplary embodiment, described later) are determined based on a balance of the angle of intersection $\theta$ and the respective internal diameters $D_1$, $D_2$ of the tapered profile portion 5a on the cavity 4 side and the opposite side to the cavity 4. However, when the mold 1 is employed in the manufacture of general vehicle seat pads, the length $T_1$ of the uniform diameter portion 5b is preferably configured in the region of from 5 mm to 10 mm and is particularly preferably in the region of from 8 mm to 10 mm.

Note that the shape of the gas discharge holes 5 is not limited to the above. For example, the gas discharge holes 5 may be configured with a tapered profile increasing in diameter on progression toward the cavity 4 side along the entire axial direction of the gas discharge holes 5. As illustrated in FIG. 2b and in FIG. 3 to FIG. 5, in the present exemplary embodiment, the inner peripheral face of the tapered profile portion 5a is a linear inclined face that opens out at a uniform angle in axial direction cross-section of the gas discharge hole 5 on progression toward the cavity 4 side, however the inside of the gas discharge holes 5 may be configured with a convex or concave curved profile.

In the present exemplary embodiment, each of the gas discharge holes 5 is provided at a gas discharge hole formation member 10 that is configured as a separate body to the upper mold 2 and that is attached to the upper mold 2. As illustrated in FIG. 2a and FIG. 2b, in the present exemplary embodiment the gas discharge hole formation member 10 has a substantially circular cylinder shape, and has a central opening configuring the gas discharge hole 5. The gas discharge hole 5 penetrates the gas discharge hole formation member 10 along the gas discharge hole formation member 10 axial direction. An outer peripheral face of the gas discharge hole formation member 10 is provided with a male thread portion 11. As illustrated in FIG. 3 to FIG. 5, gas discharge hole formation locations of the upper mold 2 are provided with female threaded holes 7 into which the male thread portions 11 are screwed. The gas discharge hole formation members 10 are removably attached to the upper mold 2 by screwing the male thread portions 11 into the female threaded holes 7.

As illustrated in FIG. 3 to FIG. 5, in the present exemplary embodiment the female threaded holes 7 penetrate the upper mold 2 such that a cavity 4 side end face (referred to below as the leading end face) of the respective gas discharge hole formation members 10 faces the inside of the cavity 4 through the female threaded hole 7. The gas discharge hole formation members 10 are screwed into the female threaded holes 7 such that the leading end faces of the gas discharge hole formation members 10 are in substantially the same plane as the cavity inner face of the upper mold 2 at the peripheries of the female threaded holes 7.

Note that the configuration of the gas discharge hole formation members 10 and the attachment method of the gas discharge hole formation members 10 to the upper mold 2 are not limited to the above. The gas discharge hole formation members 10 may be attached to the upper mold 2 using a method other than screwing (for example by resilient engagement between the gas discharge hole formation members 10 and the upper mold 2). The gas discharge hole formation members 10 need not be removable with respect to the upper mold 2. The gas discharge holes 5 may moreover be formed directly to the upper mold 2, with the gas discharge hole formation members 10 omitted. The gas discharge hole formation members 10 may be configured from the same material as the mold 1, or may be configured from a different material to the mold 1.

Next, explanation follows regarding a manufacturing sequence of a seat pad employing the mold 1.

Firstly, the upper mold 2 and the lower mold 3 are opened, the reinforcement material 6 is disposed along the cavity inner face of the upper mold 2, and the reinforcement material 6 is fixed to the upper mold 2 using the fixing implements mentioned above. When this is performed, the gas-impermeable sheets 8 provided at the reinforcement material 6 are disposed so as to overlap with the respective gas discharge holes 5 and the surrounding cavity inner face of the upper mold 2 (gas-permeable member and gas-impermeable member placement process).

Next, foamable synthetic resin raw material is injected into the lower mold 3, the lower mold 3 and the upper mold 2 are closed, and the foamable synthetic resin raw material is heated and foamed (the foam molding process). The foamed resin U that is formed by foaming the raw material fills up the inside of the cavity 4 toward the upper mold 2 cavity inner face (the reinforcement material 6) as illustrated in FIG. 1 and FIG. 3 to FIG. 5. During this process, the foamed resin U contacts the reinforcement material 6, pressing up the reinforcement material 6 such that the reinforcement material 6 approaches the upper mold 2 cavity inner face. The seat pad is thereby molded, and the back face of the seat pad is integrated together with the reinforcement material 6.

In the foam molding process, as illustrated in FIG. 3 and FIG. 4, gas inside the cavity 4 passes through the reinforcement material 6, flows between the gas-impermeable sheets 8 and the upper mold 2 cavity inner face and into the respective gas discharge holes 5, and is discharged to the outside of the cavity 4 through the respective gas discharge holes 5 up until the reinforcement material 6 is pressed up by the foamed resin U, and the gas-impermeable sheets 8 block off the respective gas discharge holes 5. Gas inside the cavity 4 is also discharged to the outside of the cavity 4 through the parting line P. Gas inside the cavity 4 is thus adequately discharged to the outside of the cavity 4, thereby preventing the occurrence of molding defects such as voids in the seat pad.

Next, when the foamed resin U has expanded sufficiently and the gas-impermeable sheets 8 are pressed firmly against the respective gas discharge hole 5 peripheral edge portions, the respective gas discharge holes 5 are blocked off by the gas-impermeable sheets 8 as illustrated in FIG. 5. The foamed resin U is thereby prevented from entering the respective gas discharge holes 5.

After the foamed resin U has cured, the mold is opened and the seat pad is removed. Processing is then performed as required to finish the surface of the seat pad, thus completing the seat pad.

The mold 1 exhibits the following operation and advantageous effects.

The mold 1 is provided with the gas-impermeable sheets 8 on the face of the reinforcement material 6 that is on the side of the gas discharge holes 5 at regions overlapping with the respective gas discharge holes 5 and the surrounding cavity inner face of the upper mold 2, thereby enabling the foamed resin U to be effectively suppressed from impregnating the reinforcement material 6 as gas inside the cavity 4 passes through the reinforcement material 6 and flows out through the respective gas discharge holes 5 during the foam molding process. As a result, the mold 1 exhibits advantageous effects such as preventing a screeching noise during use of the seat pad caused by impregnation of the reinforcement material 6 by the foamed resin U, as well as achieving a reduction in weight of the seat pad.

In the mold 1, each of the gas discharge holes 5 is configured with the tapered profile portion 5a at a portion spanning from the axial direction intermediate portion toward the cavity 4 side. The diameter of the tapered profile portion 5a increases on progression toward the cavity 4 side. The inner peripheral face of the tapered profile portion 5a and the upper mold 2 cavity inner face at the periphery of the respective gas discharge holes 5 thereby intersect at a relatively gentle angle. As a result, during the foam molding process the respective gas discharge hole 5 peripheral edge portions (namely the corner of the edge portion between the inner peripheral face of the tapered profile portions 5a of the respective gas discharge holes 5 and the cavity inner face of the upper mold 2 at the periphery of the respective gas discharge holes 5) are not liable to dig into the gas-impermeable sheets 8, even when the gas-impermeable sheets 8 are pressed by the expanding foamed resin U in a relatively low pressure state and make contact with respective gas discharge hole 5 peripheral edge portions.

Accordingly, even supposing a case in which, as illustrated in FIG. 4, the gas-impermeable sheets 8 were to contact the respective gas discharge hole 5 peripheral edge portions in a state in which gas still remains between the reinforcement material 6 and the upper mold 2 cavity inner face, since the peripheral edge portions of the gas discharge holes 5 are not liable to dig into the gas-impermeable sheets 8, it is relatively easy for the gas inside the cavity 4 to pass between the upper mold 2 cavity inner face and the reinforcement material 6 and flow into the respective gas discharge holes 5, as illustrated by the letters G in FIG. 4. As a result, as illustrated in FIG. 5, gas inside the cavity 4 is adequately discharged to the cavity 4 outside, thus adequately preventing the occurrence of molding defects such as voids in the seat pad.

Next, as expansion of the foamed resin U proceeds, the gas-impermeable sheets 8 are pressed firmly against the respective gas discharge hole 5 peripheral edge portions by the foamed resin U, such that the respective gas discharge hole 5 peripheral edge portions dig into the gas-impermeable sheets 8. The foamed resin U can thus be adequately prevented from passing between the gas-impermeable sheets 8 and the respective gas discharge hole 5 peripheral edge portions and entering the respective gas discharge holes 5. As a result, loss of the raw material of the foamed resin U can be reliably prevented, as well as facilitating a cleanup operation of the respective gas discharge holes 5.

In the present exemplary embodiment, the angle of intersection θ between the inner peripheral face of the tapered profile portion 5a of the respective gas discharge holes 5 and the upper mold 2 cavity inner face is set at from 30° to 60° in a cross-section along the axis of each of the gas discharge holes 5. The respective gas discharge hole 5 peripheral edge portions can accordingly be more reliably prevented from digging into the gas-impermeable sheets 8 excessively before the foamed resin U has expanded sufficiently, even when the gas-impermeable sheets 8 are pressed by the foamed resin U and contact the respective gas discharge hole 5 peripheral edge portions. Moreover, after the foamed resin U has expanded sufficiently, the respective gas discharge hole 5 peripheral edge portions dig into the gas-impermeable sheets 8 sufficiently to enable the foamed resin U inside the cavity 4 to be more reliably prevented from entering the respective gas discharge holes 5.

In the present exemplary embodiment, the internal diameter of the end portions of the tapered profile portions 5a of the respective gas discharge holes 5 on the opposite side to the cavity 4 (namely the smallest internal diameter of the gas discharge holes 5) is set at from 2 mm to 6 mm, thereby enabling an adequate gas discharge rate to be secured through the respective gas discharge holes 5 to the outside of the cavity 4.

In the mold 1, the upper mold 2 cavity inner face is not provided with protruded portions for delaying contact between the gas-impermeable sheets 8 and the respective gas discharge hole 5 peripheral edge portions. The surface of the completed seat pad is therefore not formed with dimpled portions corresponding to the protruded portions, thereby enabling good design characteristics to be achieved for the seat pad.

In the present exemplary embodiment, the gas-impermeable sheets 8 are configured from a pulp, or from a laminated body of a pulp and an SBR resin, giving excellent flexibility such that the gas-impermeable sheets 8 readily assume a shape conforming to the inner face of the cavity 4 when the foamed resin U has filled the inside of the cavity 4. Good shaping precision of the seat pad molded in the cavity 4, and good sealing characteristics of the respective gas discharge holes 5 by the gas-impermeable sheets 8 are accordingly enabled.

Moreover, in the present exemplary embodiment, the gas-impermeable sheets 8 are configured in sheet form and extend along the face of the reinforcement material 6 that is on the side of the gas discharge holes 5, have a thickness of from 0.05 mm to 0.2 mm, and have a tensile strength of from 30N/15 mm to 90N/15 mm and a rate of elongation of from 1% to 10% as respectively specified by JIS-Z-0237. The gas-impermeable sheets 8 accordingly have an excellent ability to conform to the inner face profile of the cavity 4, and are able to maintain a well-sealed state of the respective gas discharge holes 5 with respect to the pressing force of the foamed resin U inside the cavity 4. Even better shaping precision of the seat pad, and even better sealing characteristics of the respective gas discharge holes 5 by the gas-impermeable sheets 8 are accordingly enabled.

In the present exemplary embodiment, the pressure-sensitive adhesive or bonding agent for adhering the gas-impermeable sheets 8 to the reinforcement material 6 does not contain organic solvent, or contains organic solvent at a ratio of 0.5% by mass or lower, such that volatile organic compounds are in effect completely or almost completely eliminated from the pressure-sensitive adhesive or bonding agent. The release of volatile organic compounds from the seat pad can accordingly be reliably prevented or suppressed.

Second Exemplary Embodiment

Figure 7:
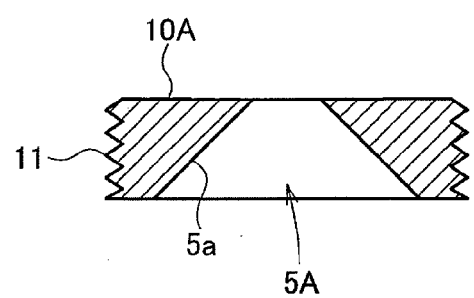
FIG. 7 is a cross-section view illustrating another configuration example of a gas discharge hole.

FIG. 7 is a cross-section view illustrating another configuration example of a gas discharge hole. Note that FIG. 7 illustrates a cross-section of a similar portion of a gas discharge hole formation member to that shown in FIG. 2b.

A gas discharge hole 5A of the present exemplary embodiment does not include the contiguous uniform diameter portion 5b on the opposite side of the tapered profile portion 5a to the cavity 4. The entire axial direction of the gas discharge hole 5A is configured with a tapered profile that increases in diameter on progression toward the cavity 4 side. Preferable dimensions and the like of respective portions of the gas discharge hole 5A are similar to those of the gas discharge hole 5 of the first exemplary embodiment.

Other configurations of a gas discharge hole formation member 10A provided with the gas discharge hole 5A are similar to those of the gas discharge hole formation member 10 of the first exemplary embodiment, and in FIG. 7 similar portions thereto are illustrated using the same reference numerals as in FIG. 2b. Moreover, FIG. 7 illustrates only the gas discharge hole formation member 10A, however the gas discharge hole formation member 10A is attached to the mold 1 similarly to the gas discharge hole formation member 10 of the first exemplary embodiment.

The mold 1 provided with the gas discharge hole 5A according to the second exemplary embodiment exhibits similar operation and advantageous effects to the first exemplary embodiment.

Third Exemplary Embodiment

Figure 8:
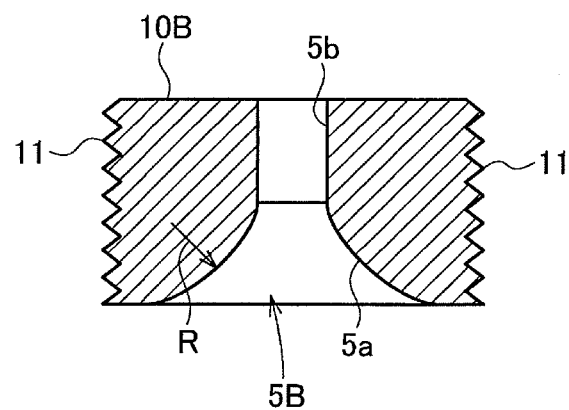
FIG. 8 is a cross-section view illustrating another configuration example of a gas discharge hole.

FIG. 8 is a cross-section view illustrating another configuration example of a gas discharge hole. Note that FIG. 8 illustrates a cross-section of a similar portion of a gas discharge hole formation member to that shown in FIG. 2b.

In a gas discharge hole 5B of the present exemplary embodiment, the inner peripheral face of a tapered profile portion 5a is configured with a convex curved profile toward the gas discharge hole 5B inside in a cross-section along the axial direction. Such a configuration makes a peripheral edge portion of the gas discharge hole 5B even less liable to dig into a gas-impermeable member during the foam molding process, even when the gas-impermeable sheet 8 is pressed by the expanding foamed resin U in a relatively low pressure state inside the cavity 4 and makes contact with the peripheral edge portions of the respective gas discharge hole 5B. Suitable dimensions and the like of respective portions of the gas discharge hole 5B are similar to those of the gas discharge hole 5 of the first exemplary embodiment.

Other configurations of a gas discharge hole formation member 10B provided with the gas discharge hole 5B are similar to those of the gas discharge hole formation member 10 of the first exemplary embodiment, and in FIG. 8 similar portions thereto are illustrated using the same reference numerals as in FIG. 2b. Moreover, FIG. 8 illustrates only the gas discharge hole formation member 10B, however the gas discharge hole formation member 10B is attached to the mold 1 similarly to the gas discharge hole formation member 10 of the first exemplary embodiment.

Other operation and advantageous effects exhibited by the mold 1 provided with the gas discharge hole 5B according to the third exemplary embodiment are similar to those of the first exemplary embodiment.

EXAMPLES

Example 1

A mold 1 of the first exemplary embodiment is produced with the angle of intersection θ between the inner peripheral face of the tapered profile portion 5a of the gas discharge hole 5 and the inner face of the cavity 4 set at 45°, the internal diameter $D_1$ of the end portion of the tapered profile portion 5a on the opposite side to the cavity 4 set at 6 mm, the internal diameter $D_2$ of the cavity 4 side end portion of the tapered profile portion 5a set at 10 mm, the length $T_1$ of the uniform diameter portion 5b set at 8 mm, and the axial direction length $T_2$ of the gas discharge hole formation member 10 set at 10 mm. A seat pad is then manufactured employing the mold 1.

The reinforcement material 6 of the seat pad employs a nonwoven fabric. The gas-impermeable sheets 8 employ a laminated body of a pulp (Japanese paper) and an SBR resin. The size of the gas-impermeable sheets 8 is set at 50 mm×50 mm², the thickness of the gas-impermeable sheets 8 is set at 0.09 mm, the tensile strength is 44N/15 mm, and the rate of elongation is 3.0%, as respectively specified by JIS-Z-0237. The pressure-sensitive adhesive or bonding agent for adhering the gas-impermeable sheets 8 to the reinforcement material 6 is an acrylic copolymer synthetic resin, and does not contain organic solvent.

Pressure change inside the cavity 4 over time is measured during the foam molding process of the seat pad.

Comparative Example 1

Figure 9:
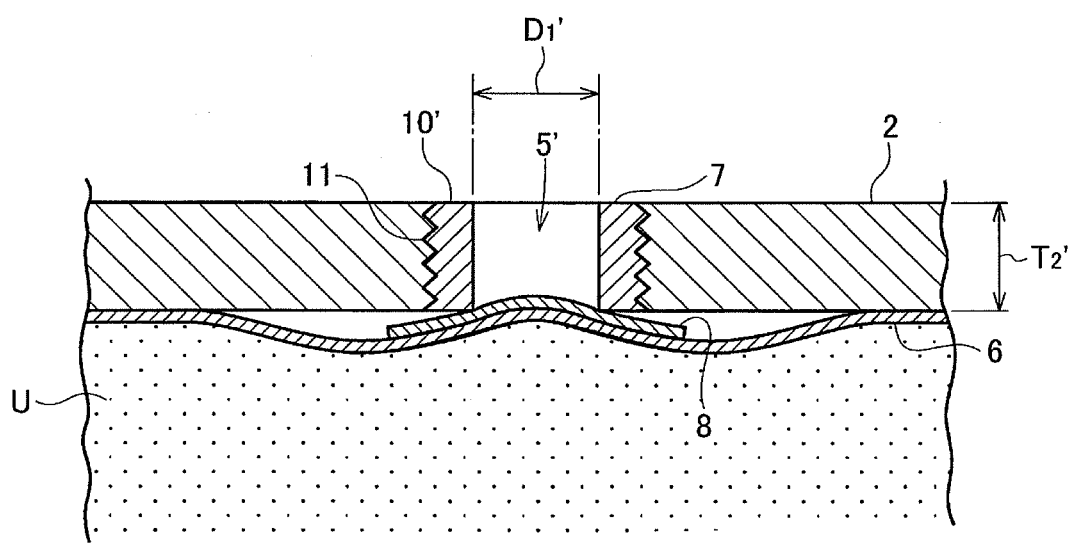
FIG. 9 is a cross-section view illustrating a mold according to a Comparative Example partway through a foam molding process.

FIG. 9 is a cross-section view illustrating a mold according to a Comparative Example 1 partway through the foam molding process.

As illustrated in FIG. 9, in Comparative Example 1 a gas discharge hole formation member 10' provided with a gas discharge hole 5' that has a substantially uniform internal diameter $D_1'$ from a cavity 4 inner portion side to a cavity 4 outer portion side is attached to a mold 1 in place of the gas discharge hole formation member 10 provided with the gas discharge hole 5. Namely, in Comparative Example 1, an angle of intersection of 90° is formed between the inner peripheral face of the gas discharge hole 5' and the inner face of the cavity 4. The internal diameter $D_1'$ of the gas discharge hole 5' is set at 10 mm, and an axial direction length $T_2'$ of the gas discharge hole formation member 10' is set at 10 mm. A seat pad is manufactured employing the mold 1 provided with the gas discharge holes 5', with other configurations similar to those of Example 1. Pressure change inside the cavity 4 over time is measured during the foam molding process.

Figure 10:
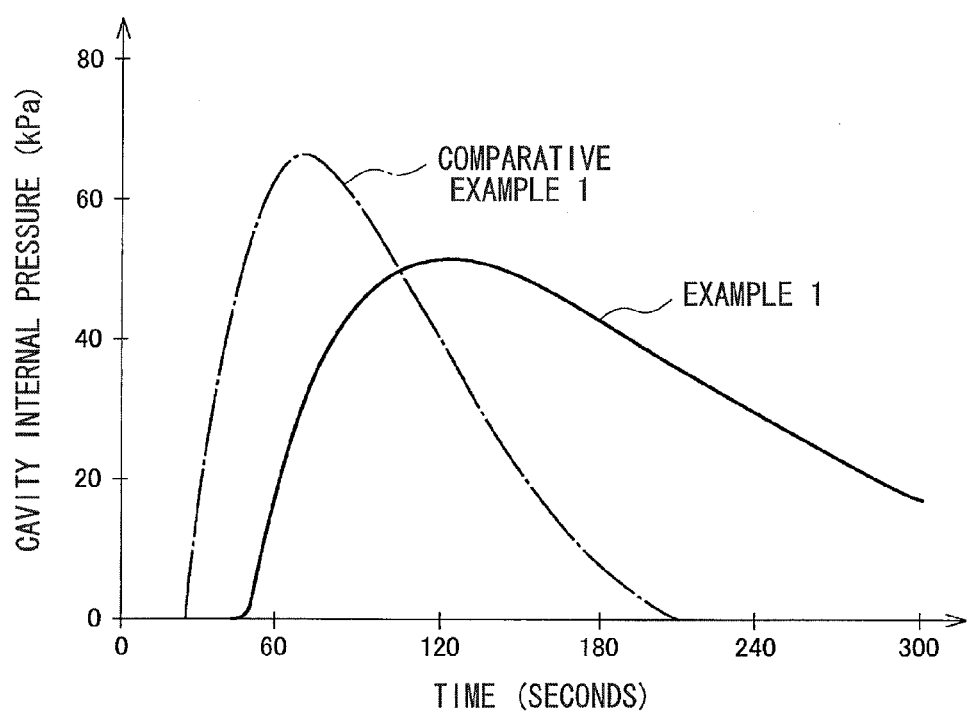
FIG. 10 is a graph illustrating changes in internal pressure during a foam molding process in respective molds according to an exemplary embodiment and the Comparative Example.

FIG. 10 illustrates measurement results of pressure changes inside the cavity 4 over time for Example 1 and Comparative Example 1.

As illustrated in FIG. 10, in Comparative Example 1 the pressure inside the cavity 4 peaks sooner than in Example 1. Observation of the seat pad manufactured using Comparative Example 1 reveals hollows at the seat pad surface caused by gas remaining inside the cavity 4. However, hollows are not present in the seat pad manufactured using Example 1.

It can thus be seen that in Comparative Example 1, during the foam molding process the gas discharge holes 5 are blocked off by the gas-impermeable sheets 8 at the point that the gas-impermeable sheets 8 pressed by the expanding foamed resin U contact the peripheral edge portions of the gas discharge holes 5, leaving gas remaining inside the cavity 4. However in Example 1, during the foam molding process the gas discharge holes 5 are not blocked off by the gas-impermeable sheets 8 at the point that the gas-impermeable sheets 8 pressed by the expanding foamed resin U contact peripheral edge portions of the gas discharge holes 5, enabling gas inside the cavity 4 to be adequately discharged to outside the cavity 4.

Measurement of the amount of volatile organic compounds (VOC) released from the seat pad manufactured using Example 1 reveals effectively no difference to the amount of VOC released when the gas-impermeable sheets 8 are not adhered to the reinforcement material 6. It can accordingly be seen that employing a pressure-sensitive adhesive or bonding agent that does not contain organic solvent to adhere the gas-impermeable sheets 8 to the reinforcement material 6 enables release of volatile organic compounds from the seat pad to be reliably reduced or suppressed.

[Explanation Regarding the Particularly Preferable Angle of Intersection θ from 30° to 60°]

Molds 1 are produced with similar configuration to the first exemplary embodiment, other than in the respect that the angle of intersection θ is respectively changed to 15° (Example 2), 30° (Example 3), 45° (Example 4), 60° (Example 6) and 75° (Example 6). Seat pads are manufactured using the respective molds 1. Specifically, plural gas discharge hole formation members 10 are produced for the angle of intersection θ being each of the above angles, and the gas discharge hole formation members 10 are swapped into the mold 1 for each of the Examples, and seat pads are manufactured. Plural seat pads are manufactured for each of Example 2 to Example 6, with pressure change inside the cavity 4 over time measured during the respective foam molding processes, and the surface of the manufactured seat pads are inspected for the presence of hollows, similarly to in Example 1.

In testing, there is somewhat greater variation in the cavity 4 internal pressure values during the respective foam molding processes at θ=15° and θ=75° than at θ=30°, θ=45° and θ=60; the occurrence of surface hollows is suppressed to half of the total seat pads. At θ=30°, θ=45° and θ=60°, there is little variation in the cavity 4 internal pressure values during the respective foam molding processes. Moreover, at θ=30° the occurrence of surface hollows drops to one third of the total seat pads, and at θ=60° the occurrence of surface hollows drops to one quarter of the total seat pads. At θ=45°, effectively none of the manufactured seat pads have surface hollows.

As can be seen from the above results, the angle of intersection θ is particularly preferably from 30° to 60°, even more preferably from 40° to 50°, and most preferably 45°, since this enables seat pads to be manufactured with good shaping precision and high yield.

Each of the above exemplary embodiments are merely examples of the present invention, and configurations other than those illustrated may also be adopted.

For example, in each of the above exemplary embodiments, examples are given in which the present invention is applied to a seat pad, however the present invention may also be applied to foamed molded bodies other than seat pads.

Explanation of the present invention has been given using specific embodiments, however it would be clear to a practitioner skilled in the art that various modifications are possible without departing from the spirit and scope of the present invention. Note that the present application is based on Japanese Patent Application No. 2011-262361 submitted on Nov. 30, 2011, the disclosure of which is incorporated in entirety by reference herein.

The invention claimed is:

1. A foamed molded body manufacturing method for manufacturing a foamed molded body configured from a foamed synthetic resin, employing a mold, the mold comprising:
   a gas discharge hole that is provided at a cavity inner face of the mold and that discharges gas inside a cavity to outside the cavity;
   a gas-permeable member that is disposed inside the cavity so as to cover the gas discharge hole; and
   a gas-impermeable member that is disposed on a gas discharge hole side of the gas-permeable member so as to face the gas discharge hole,
   wherein a portion of the gas discharge hole, spanning at least from an intermediate portion in the axial direction of the gas discharge hole to a cavity side of the gas discharge hole, is configured with a tapered profile portion that increases in diameter on progression toward the cavity side, the foamed molded body manufacturing method comprising:
   a gas-permeable member and gas-impermeable member placement process of disposing the gas-permeable member inside the cavity of the mold so as to cover the gas discharge hole, and disposing the gas-impermeable member on the gas discharge hole side of the gas-permeable member so as to the face the gas discharge hole; and
   a foam molding process of foaming a foamable synthetic resin raw material inside the cavity after the gas-permeable member and gas-impermeable member placement process,
   wherein:
   the gas-impermeable member is configured in a sheet form extending along a gas discharge hole side face of the gas-permeable member; and
   the gas-impermeable member has a thickness of from 0.05 mm to 0.2 mm, a tensile strength of from 30N/15 mm to 90N/15 mm as specified by JIS-Z-0237, and an elongation percentage of from 1% to 10% as specified by JIS-Z-0237.

2. The foamed molded body manufacturing method of claim 1, wherein:
   the gas-impermeable member is adhered to the gas-permeable member using a pressure-sensitive adhesive or bonding agent; and
   the pressure-sensitive adhesive or bonding agent does not contain organic solvent, or any organic solvent contained in the pressure-sensitive adhesive or bonding agent is present in an amount of 0.5% by mass or lower of the total mass of the adhesive or bonding agent.

3. The foamed molded body manufacturing method of claim 1, wherein the gas-impermeable member is configured from a pulp, or from a laminated body of a pulp and an SBR resin.

4. The foamed molded body manufacturing method of claim 1, wherein the foamed molded body is a seat pad.

5. The foamed molded body manufacturing method of claim 2, wherein the foamed molded body is a seat pad.

6. The foamed molded body manufacturing method of claim 3, wherein the foamed molded body is a seat pad.

* * * * *